United States Patent

[11] 3,633,190

[72] Inventors Gijsbertus B. Morsing;
Theqnis Brinkman, both of Nijmegen, Netherlands
[21] Appl. No. 875,155
[22] Filed Nov. 10, 1969
[45] Patented Jan. 4, 1972
[73] Assignee The Singer Company
Rochester, N.Y.

[54] APPARATUS FOR INTERPRETING INFORMATION RECORDED ON AN ERASABLE STORAGE MEDIUM, AND FOR MAKING IT POSSIBLE TO REPLACE SUCH INFORMATION IN FULL OR IN PART
4 Claims, 5 Drawing Figs.

[52] U.S. Cl. 340/174.1 H
[51] Int. Cl. G11b 5/04
[50] Field of Search 340/174.1 B, 174.1 G, 174.1 H; 179/100.2 MD, 100.2 S

[56] References Cited
UNITED STATES PATENTS

| | | | |
|---|---|---|---|
| 2,854,526 | 9/1958 | Morgan | 340/174.1 |
| 2,963,555 | 12/1960 | Brubaker | 179/100.2 |
| 3,196,421 | 7/1965 | Grace et al. | 179/100.2 |
| 3,402,350 | 9/1968 | Shellabarger | 340/174.1 |
| 3,412,385 | 11/1968 | Wang et al. | 340/174.1 |
| 3,445,832 | 5/1969 | Leeke et al. | 340/174.1 |

*Primary Examiner*—James W. Moffitt
*Assistant Examiner*—Vincent P. Canney
*Attorneys*—George W. Killian, Patrick J. Schlesinger, Charles R. Lepchinsky and Jay M. Cantor

ABSTRACT: A method of interpreting and recording information wherein recordal markings are recorded on a recording medium and information signals are recorded at clock frequencies and a control voltage of a pulse generator is then impressed on a medium value of a control range to accommodate tolerance of components used. Clock synchronization is effected by dividing the clock pulses into a frequency in which the interval between the pulses in the synchronized state equals the measured time interval between the markings, and then comparing the time interval between the pulses of this signal with the time interval between the readout markings. If there is a difference between these two intervals, this is converted into a voltage difference, which is amplified to control the pulse generator.

INVENTORS
GIJSBERTUS B. MORSING
THEONIS BRINKMAN

BY Samuel R. Genca
ATTORNEY

APPARATUS FOR INTERPRETING INFORMATION RECORDED ON AN ERASABLE STORAGE MEDIUM, AND FOR MAKING IT POSSIBLE TO REPLACE SUCH INFORMATION IN FULL OR IN PART

This invention relates to a method of interpreting information recorded on an erasable storage medium, and for making it possible to selectively replace such information in full or in part.

As is well known, the timing of all operations to be performed in data-processing systems requires clock pulses. This also applies to the interpretation of information recorded on an erasable storage medium and the replacement thereof, in full or in part, on the basis of such interpretation.

In known systems, such timing is achieved by providing the storage medium with markings for generating the required clock pulses in addition to the data tracks recorded thereon. Although this has the advantage that synchronism of clock pulses and data pulses is achieved in a simple manner, this solution also has a great disadvantage. As a matter of fact, in the known data-processing systems, it is unavoidable that phase-shifting occurs between the clock pulses and the information pulses, for example, owing to mechanical clearance of the storage medium. If such phase-shifting exceeds a certain magnitude of time, correct interpretation of the information is no longer possible. This is especially felt if it is desired for a storage medium recorded by means of a data-processing system to be read-out in a different data-processing system. In the case of data exchange, for example, when a data-carrying disc memory is mailed to a remote station, there is no sufficient certainty that the information is correctly interpreted. In replacing information recorded in the memory, there is also a great chance of errors being made, especially in the case of replacing characters within a group of characters.

One object of this invention is to provide a method by which information recorded in an erasable memory can always be interpreted and/or replaced in full or in part without errors.

The object is achieved according to the invention by using a pulse generator whose frequency is adapted to the measured speed of the storage medium relative to the read/write station by means of a servosystem and with a response determined by said servosystem.

Favorable results are obtained with the method according to the invention, however, by measuring the speed of the storage medium relative to the read/write station by means of markings spaced on the storage medium, or, in other words, by adapting the speed of the pulse generator to the speed at which information is read from the memory.

Preferably, said markings are the initial points of each character in a series of characters. Naturally, it is also possible to use the initial points of "groups" of characters as markings, such "group" being a number of series of characters. The markings must then be so arranged as to form segments of equal length, so that the speed of the storage medium relative to the read/write station can be derived from the repetition frequency of these segments during both reproduction and recordal.

In certain cases replacement of information recorded in the memory may be effected by just superimposing new information on the information to be replaced. In order that this may be started at the right moment, it is necessary to switch over to writing immediately after the initial point of the character or group of characters concerned has been read, the marking of a segment being not necessarily the same as the initial point of a character or group of characters. Since the length of the number of segments to be altered in the memory is known, it can be ensured that writing is continued for a sufficiently accurate period of time derived from the speed of the storage medium relative to the read/write station. If writing should be discontinued too early, there is the danger that old information is not erased. If writing is continued unduly long, good information will be destroyed.

The time can be measured digitally by means of a counter which steps on in direct proportion to the clock frequency.

By virtue of the fact that the synchronization technique according to the present invention calls for the initial points of each character in a series of characters, or of each group in a series of groups of characters to be spaced equal distances from each other, it will be understood that in rewriting information, the information content of the characters may be changed, but the place of the markings must not be changed. Therefore, a subdivision of a storage medium, once established, must not be disturbed by subsequent manipulations. In order to ensure that a track of information is efficiently set with characters and/or groups of characters, the track is first subdivided in its virginal state or in a state in which old information has been disturbed in one way or another. For this purpose, the entire track may be written with characters, the contents of which are irrelevant, but the clock frequency with which they have been written has significance. The control voltage of the pulse generator is then impressed on the median value of the control range, which range should be such as to accommodate tolerances of the components used (e.g., R and C value of the pulse generator, speed of the motor).

Clock synchronization is effected by dividing the clock pulses into a frequency in which the interval between the pulses in the synchronized state equals the measured time interval between the markings, and then comparing the time interval between the pulses of this signal with the time interval between the readout markings. If there is a difference between these two intervals, this is converted into a voltage difference, which is amplified to control the pulse generator.

The invention will now be further described in the light of an exemplary embodiment and with reference to the drawings.

Figure 1:
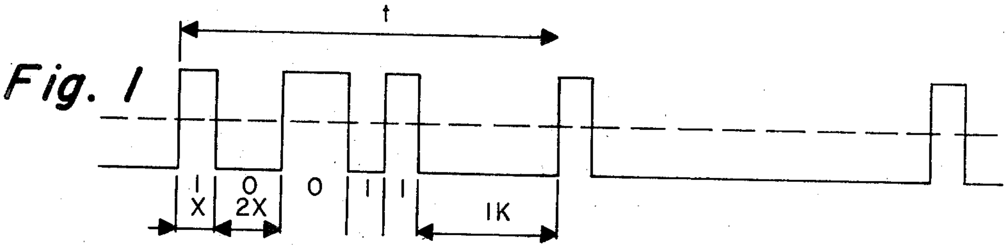
FIG. 1 shows a nonreturn to zero information pulse code suitable for the method according to the invention.

Referring to FIG. 1, there is shown a nonreturn to zero information pulse. In it, for example, the binary "1" may have a pulse time of X, and the binary "0" a pulse time of 2 X seconds. The polarity of the pulses is irrelevant, but each marking must begin with the same polarity, e.g., positive.

This is shown in FIG. 1 in which the first bit represents a binary "1." The next bit, in this case a binary "0" is then negative. If the latter bit should have been binary "1," it would also have been negative. The point is, therefore, that the point of time of the transition from positive to negative and vice-versa indicates the separation between consecutive bits, the duration of the pulse being determinant for the binary value of each bit. It will further be clear that the total length of a character will depend on the number of "0's" and "1's" in the character, and that, with the code according to FIG. 1, in which the pulse duration of a binary "0" is twice as long as that of a binary "1" a character exclusively consisting of "0's" has a maximum length. This maximum length must be taken into account in recording the initial points of each character on the memory medium, because, in order for a uniform series of clock pulses to be generated requires the starting points to be spaced uniform distances from each other, if it is desired for these starting points to be used as markings for synchronizing the clock pulses, without running the risk of overlapping characters. Consequently, varying gaps occur between the individual characters. That is to say, there are blank portions between the characters which carry no information content. In order that these portions may be distinguished from the portions representing a binary "1" or a binary "0," these blank portions are at least three bit periods, i.e., 3 X long. A blank portion is designated IK (inter-character) in FIG. 1, the total period of time of a character together with the period of time of the blank portion, which together form a segment, being $t$ seconds.

Figure 2:
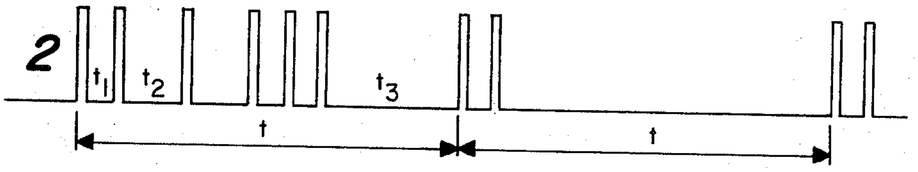
FIG. 2 illustrates the pulse transitions of FIG. 1.

FIG. 2 illustrates the points of time of the transition from positive to negative and vice versa This clearly shows a distinction between the periods $t_1$, $t_2$ and $t_3$, which respectively indicate the pulse period of a binary "1," a binary "0," and the period of a blank space IK between two characters.

In order that a character may be interpreted, it is necessary, therefore, to measure these periods. This can be effected, for example, by means of a counter adapted to step on clock pulses having a higher repetition frequency than the bit pulses of FIG. 2. In such interpretation, the accuracy of the measurements is not critical.

When information in the storage medium is partly or entirely replaced, however, it does require great precision, or there will be the danger that the new information does not accurately cover the old information in the segment, so that either old information is not fully erased, or good information from adjacent segments is destroyed. To prevent this, according to the invention, clock synchronization is applied.

Figure 3:
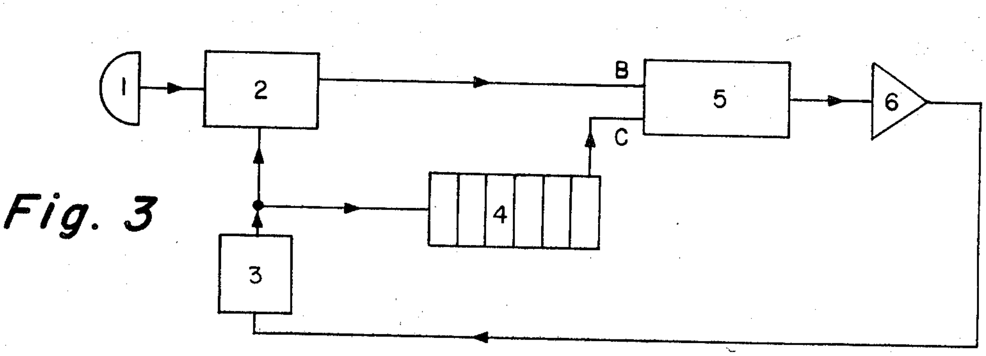
FIG. 3 shows a block diagram of a preferred embodiment of a synchronization system suitable for carrying out the method according to the invention.

A block diagram of a preferred embodiment of a synchronization system suitable for carrying out the method according to the invention is shown in FIG. 3. In it, 1 is a read/write head, 2 a logical circuit, 3 a pulse generator, 4 a frequency divider, 5 a comparative circuit, and 6 a control amplifier.

The purpose of the circuit arrangement shown in FIG. 3 is to adapt the velocity of the pulse generator 3 to the velocity at which the information stored in a storage medium is read by the read/write head.

Figure 4:
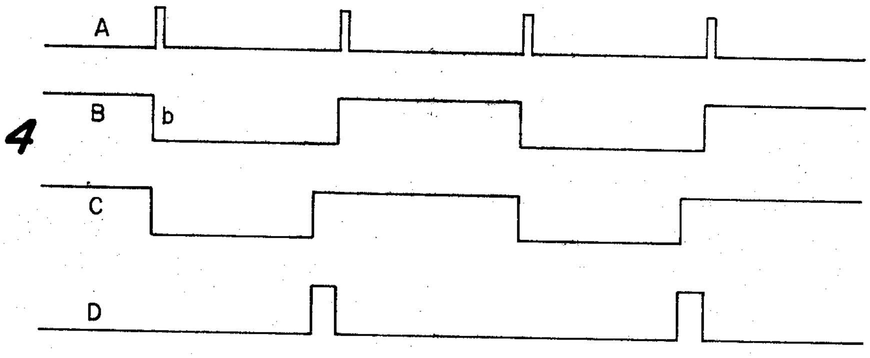
FIG. 4 shows a survey of the pulse configurations as occurring at the outputs or inputs of the switch units associated with the synchronization system.

The operation of the arrangement according to FIG. 3 for effecting such synchronization will be best understood in conjunction with FIG. 4.

Generally, the control of the speed of the pulse generator comprises detecting the speed of the storage medium, comparing this speed with the speed of the pulse generator, and then bringing the speed of the pulse generator into agreement with the speed of the storage medium through reverse feedback.

In the logical circuit 2, the initial points of the characters are selected from the information read by the read/write head 1, and subsequently converted into a rectangular wave. The selection results in a signal as shown at A in FIG. 4, wherein the pulses shown represent the initial pulses of the successive characters, and the distance between the leading flanks of two consecutive pulses constitutes a character segment.

In the logical circuit 2, the signal A is subsequently converted into a rectangular wave B, such that the polarity of the signal is alternately changed at the successive initial pulses of the characters. This output signal B is fed into one of the two inputs of the comparator circuit 5.

The clock pulses of the pulse generator 3 are divided in the frequency divider 4 to a frequency having a period which in the synchronized condition must be equal to the measured time interval between the marking points. The output signal of the frequency divider, which, for example, has the wave form as indicated by C, is fed into the other input of the comparator circuit 5, and is compared with the signal B in this circuit.

Generally speaking, the signals B and C will not immediately be equal to one another. In the example given in FIG. 4, the signal C is found to be more rapid, or of a greater frequency, than the signal B. The frequency divider 4 is so connected as to be reset to zero by the signal A at a negative flank of the signal B, such as at $b$. If now, as supposed in the FIG., the positive flank of C comes earlier than that of B, the speed of the pulse generator is too high. If the positive flank of C comes later, the speed of the pulse generator is too low.

Figure 5:
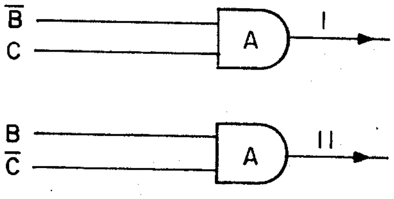
FIG. 5 shows the gate circuit arrangements in a comparator circuit arrangement of the block diagram according to FIG. 3.

The comparator circuit 5 comprises two gate circuits, shown separately in FIG. 5. The signals B and C are fed to these gate circuits. When the positive flank of C comes earlier than the positive flank of B, so that, as stated before, the speed of the pulse generator is too high, then there is the situation as shown in the upper circuit of FIG. 5, namely, CB=1 (=logical 1). The situation BC=1 (=logical 1) occurs when the positive flank of B comes first, so that the speed of the pulse generator is too low. For the area around the positive flanks of C, the comparator signal, in the case indicated in FIG. 4, then has the form as designated by D in FIG. 4.

The width of the pulses of the signal D is a measure for the size of the correction to be fed to the pulse generator. Per period of signal C, correction is only effected with reference to the positive flank. The correction of the negative flanks of B and C is suppressed. The signals I and II go to an integrating circuit in the comparator circuit 5, the output of which is fed to control amplifier 6. This amplifier is in a known manner so arranged that its output signals feed back the speed of the pulse generator in a negative manner.

The information carried by the storage medium usually has been so recorded that there is a blank portion intermediate the groups of characters, which is considerably longer than the blank portions (IK) between the individual characters. The blank portion between the groups, for example, has a length corresponding with the length of a complete character. To prevent that, in such a case, owing to the fact that a pulse B is not forthcoming, the generated "long" pulse D unduly upsets the mechanism, a differential circuit arrangement is used at one input of the integrating circuit.

The control of amplifier 6 will not be further described, since it is considered to be well-known per se.

As stated before, it is necessary for the method according to the invention that segments of equal lengths are formed in the memory, so that the initial pulses of the markings are recorded in the storage medium in uniformly spaced relationship. It is therefore necessary that the information track of a blank memory is first divided into segments before recording the desired information characters therein. For this purpose, use can be made of a counter arranged to proceed in step with the frequency of the pulse generator, so that the markings can be applied to the storage medium by writing characters throughout the track, the contents of which characters is without significance, the only relevance being the frequency at which they are written.

In order that subsequently the characters may be replaced by the desired information, the read/write head is switched to "read", and immediately after the initial pulse of the first character has been read, switched back to "write". The writing of the new characters automatically erases the old characters. It will be clear that by applying the method as described, even the replacement of one character no longer involves difficulties.

When the initial pulses of the characters are written for the first time, it is of importance to ensure that the control voltage for the pulse generator is adjusted to the median value of the control range. It should further be ensured beforehand that the control range is so large as to accommodate tolerances for the switch units used.

What is claimed is:

1. In a data-processing system wherein data is selectively recorded in a serial-by-bit mode on an erasable medium and wherein each character is assigned a period of uniform duration although the periods of the "1" and "0" bits are not equal to each other the combination comprising:

a. a read/write head for reading data from said erasable medium and for writing new data on said erasable medium and simultaneously erasing any data previously recorded on said erasable medium;

b. uniquely distinguishable block-indicating signals recorded on said erasable medium as an integral part of the recorded data signal and spaced at equidistant intervals for indicating the initial signal of each block of data;

c. drive means for moving said erasable medium at a uniform speed relative to said read/write head;

d. a signal source with an adjustable frequency rate for generating signals at approximately the same frequency said uniquely distinguishable block-indicating signals are read by said read/write head when said erasable medium is moved in response to the action of said drive means;

e. a comparator having as a first input thereof signals from said signal source and as a second input thereof said uniquely distinguishable block indicating signals as read by said read/write head, for producing an output signal indicative of the magnitude and direction of any frequency difference or phase shift between said first and second input signals; and f. feedback control means coupled to the output of said comparator and to said signal source for adjusting the pulse repetition rate of said signal source to minimize any frequency difference or phase shift between said first and second input signals to said comparator.

2. The combination as set forth in claim 1 wherein said signal source comprises a pulse generator and a frequency divider.

3. The combination as set forth in claim 2 wherein said read/write head is controlled by said feedback control means and in response to signals therefrom writes new uniquely distinguishable block-indicating signals which are superimposed on previously recorded uniquely distinguishable block indicating signals followed by new block data whereby a newly recorded block always commences at the same place as the previously recorded block.

4. The combination as set forth in claim 3 wherein said uniquely distinguishable block-indicating signals comprise the initial bit of each character in a series of characters.

* * * * *